United States Patent
Gayer

(10) Patent No.: US 8,223,241 B2
(45) Date of Patent: Jul. 17, 2012

(54) SELF SHOT CAMERA

(76) Inventor: Robbyn Gayer, Norfolk, VA (US)

(*) Notice: Subject to any disclaimer, the term of this patent is extended or adjusted under 35 U.S.C. 154(b) by 735 days.

(21) Appl. No.: 12/335,149

(22) Filed: Dec. 15, 2008

(65) Prior Publication Data

US 2010/0149398 A1   Jun. 17, 2010

(51) Int. Cl.
*H04N 5/222* (2006.01)

(52) U.S. Cl. .................... 348/333.01; 348/373

(58) Field of Classification Search ............ 348/211.7, 348/333.01–333.13
See application file for complete search history.

(56) References Cited

U.S. PATENT DOCUMENTS

| | | | |
|---|---|---|---|
| 4,227,790 A | 10/1980 | Shenk | |
| 5,270,761 A | 12/1993 | Kwak | |
| 5,408,287 A | 4/1995 | Winegarden et al. | |
| 5,532,782 A | 7/1996 | Mori et al. | |
| 6,567,618 B2 | 5/2003 | Kai et al. | |
| 6,738,095 B2 * | 5/2004 | Dibella et al. | 348/373 |
| 6,812,967 B1 | 11/2004 | Nikawa et al. | |
| 7,151,571 B2 | 12/2006 | Yip | |
| 7,173,665 B2 * | 2/2007 | Kawasaki et al. | 348/376 |
| 7,295,720 B2 * | 11/2007 | Raskar | 382/312 |
| 7,375,755 B2 * | 5/2008 | Oya et al. | 348/333.02 |
| 7,623,158 B2 * | 11/2009 | Kunieda | 348/220.1 |
| 2006/0050982 A1 * | 3/2006 | Grosvenor | 382/255 |
| 2009/0021850 A1 * | 1/2009 | Sun | 359/872 |
| 2011/0032377 A1 * | 2/2011 | Kim et al. | 348/222.1 |

FOREIGN PATENT DOCUMENTS

| | | | |
|---|---|---|---|
| JP | 2001-318421 | * | 11/2001 |
| JP | 2001318421 | | 11/2001 |
| JP | 2006343429 | | 12/2006 |
| KR | 1020050094941 | | 9/2005 |

* cited by examiner

*Primary Examiner* — Aung S Moe
(74) *Attorney, Agent, or Firm* — Webb IP Law Group; Jason P. Webb; Danny Y. H. Cheng

(57) ABSTRACT

A camera for facilitating multi-positioned photography, wherein the camera includes a housing and a lens. The camera also includes a pair of control interfaces disposed on the top side and the bottom side of the housing. In addition, the camera includes a pair of flashes oppositely disposed on the front side of the housing. Furthermore, the camera may include a pair of display modules disposed on the front side and the back side of the housing. The camera includes an orientation module and a control module, configured to control an aspect of functionality of the camera according to the orientation information from the orientation module. The control module includes a self-shot module configured to automate a setting while taking a self photo.

14 Claims, 3 Drawing Sheets

SELF SHOT CAMERA

BACKGROUND OF THE INVENTION

1. Field of the Invention

The present invention relates to cameras, specifically to a camera for facilitating multi-positioned photography.

2. Description of the Related Art

The ability to visually record moments through cameras and related technologies has transformed our society. Cameras are used to preserve memories, provide news, generate entertainment, and communicate ideas. The many manufacturers of cameras have provided a great variety of ergonomic camera designs configured to facilitate the different uses of a camera and to allow users to easily grasp, hold, and use the camera.

Modern cameras are generally designed with a trigger button disposed about the right side of the camera body so that a user operates the camera with his/her right hand. However, the conventional design is not suitable for all uses and so other configurations have been developed. For example, left hand cameras have been developed wherein a trigger button is disposed about the left side of the camera body.

Some improvements have been made in the field. Examples of references related to the present invention are described below, and the supported teachings of each reference are incorporated by reference herein:

U.S. Pat. No.: 7,151,571, issued to Yip, discloses a digital camera for use by both left-handed and right-handed users. The digital camera has a body design that employs a swivel mechanism and symmetric placement of pertinent camera hardware components, particularly flash devices.

U.S. Pat. No.: 6,567,618, issued to Kai et al., discloses a camera body has grip portions for right-handed users and the left-handed users provided respectively on the right and left sides thereof. A release button to be operated by the right hand is mounted on the side of the grip portion for right-handed users, and a release button to be operated by the left hand is mounted on the side of the grip portion for left-handed users. A ring member is rotatably mounted about a lens-barrel. When the ring member is rotated toward the release button for right-handed users, the release button for right-handed users is enabled, and when it is rotated toward the release button for left-handed users, the release button for left-handed users is enabled.

U.S. Pat. No.: 5,408,287, issued to Winegarden et al., discloses a photographic camera comprises a pair of right-hand and left-hand manually actuatable buttons, located proximate right and left sides of the camera body, for initiating respective camera functions and control means for changing the camera function the right-hand button. One of the right-hand and left-hand buttons is a shutter release button for initiating operation of a camera shutter. Thus, the shutter release button can be selectively tailored for right-hand or left-hand use.

U.S. Pat. No.: 5,270,761, issued to Kwak, discloses a camera body that has a pair of right-hand and left-hand symmetric openings for alternatively receiving a manually actuated camera device, such as a shutter release, thereby allowing the camera body to be tailored selectively for right-hand or left-hand use of the manually actuated camera device.

U.S. Pat. No.: 5,923,908, issued to Schrock et al., discloses a camera having a touch sensitive control with first and second positions spaced apart along a surface of the camera, and a shutter. A processor is connected to the touch sensitive control and the shutter, so that as a user slides a finger from the first to the second positions, the shutter is operated. The sliding shutter control inhibits vibration during picture taking while allowing a two-position shutter control. The touch sensitive control may particularly be a touch sensitive screen and icons controlling other camera functions can be presented thereon. These camera control icons can be re-positioned or re-sized on the screen to suit user preferences and/or physical limitations.

U.S. Pat. No.: 5,532,782, issued to Mori et al., discloses a camera having a depth priority operation mode. When the calculated stop value is less than the smallest possible stop value of a photographic lens attached to the camera, the photographic lens is driven so that the closest object is placed on the photographic lens side of the focal surface, when the closest object is focused into the photographic depth of field.

U.S. Pat. No.: 4,227,790, issued to Shenk, discloses a manual/automatic focus control mode selecting means are provided for an adjustable focus lens camera having both manual and automatic focus controls wherein said mode selecting means causes said automatic focus control to position said lens to a known reference point when the automatic focus control mode is selected and, in addition, reduces the power requirements of said automatic focus control.

U.S. Pat. No.: 6,812,967, issued to Niikawa et al., discloses a digital camera of the invention which has an LCD and an EVF. In a third display mode, a whole image is displayed on the LCD, a frame is displayed in the central area, and an image in the central area (within the frame) is enlargedly displayed on the EVF. An enlarged display icon is displayed on the LCD to thereby notify the user of the enlarged display on the EVF. The image capturing range can be confirmed on the LCD, and automatic focusing is performed on the basis of the image in the central area, so that focus can be also confirmed on the EVF. Consequently, according to the invention, both the image capturing range and the focus can be confirmed in the digital camera and an image can be efficiently captured.

The inventions heretofore known suffer from a number of disadvantages which include being difficult to use, limited to single purpose usage, being limited in adaptability, being limited in application, and being unduly complex.

What is needed is a camera that solves one or more of the problems described herein and/or one or more problems that may come to the attention of one skilled in the art upon becoming familiar with this specification.

SUMMARY OF THE INVENTION

The present invention has been developed in response to the present state of the art, and in particular, in response to the problems and needs in the art that have not yet been fully solved by currently available cameras. Accordingly, the present invention has been developed to provide a camera for facilitating multi-positioned photography.

In one embodiment of the invention, there is a camera for facilitating multi-positioned photography, wherein the camera may include a housing having a front side, a back side, a left side, a right side, a top side, and a bottom side. The camera may also include a pair of control interfaces disposed on the top side and the bottom side of the housing. In addition, the camera may include a pair of flashes oppositely disposed on the front side of the housing. Furthermore, the camera may include a pair of display modules disposed on the front side and the back side of the housing.

The front side of the housing may include a lens. The camera may include an orientation module configured to detect an orientation of the housing. The orientation module may activate either control interfaces depending on the orientation or configuration of the camera. The orientation module may also activate a flash module depending on the orientation or configuration of the camera. The camera may also include a control module in communication with the orientation module and configured to control an aspect of functionality of the camera according to the orientation information from the orientation module. The control module may include a self-shot module configured to automate a setting while taking a self photo. The control module may also include a user data module configured to store information regarding a characteristic of a user. In addition, the control module may activate another module according to orientation information from the orientation module. The control module may also deactivate a module according to orientation information from the orientation module. The user data module may include information related to a predetermined focal length of the camera depending on the user's height and/or arm length.

Reference throughout this specification to features, advantages, or similar language does not imply that all of the features and advantages that may be realized with the present invention should be, or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order for the advantages of the invention to be readily understood, a more particular description of the invention briefly described above will be rendered by reference to specific embodiments that are illustrated in the appended drawing(s). It is noted that the drawings of the invention are not to scale. The drawings are mere schematics representations, not intended to portray specific parameters of the invention. Understanding that these drawing(s) depict only typical embodiments of the invention and are not, therefore, to be considered to be limiting its scope, the invention will be described and explained with additional specificity and detail through the use of the accompanying drawing(s), in which.

DETAILED DESCRIPTION OF THE INVENTION

Figure 1:
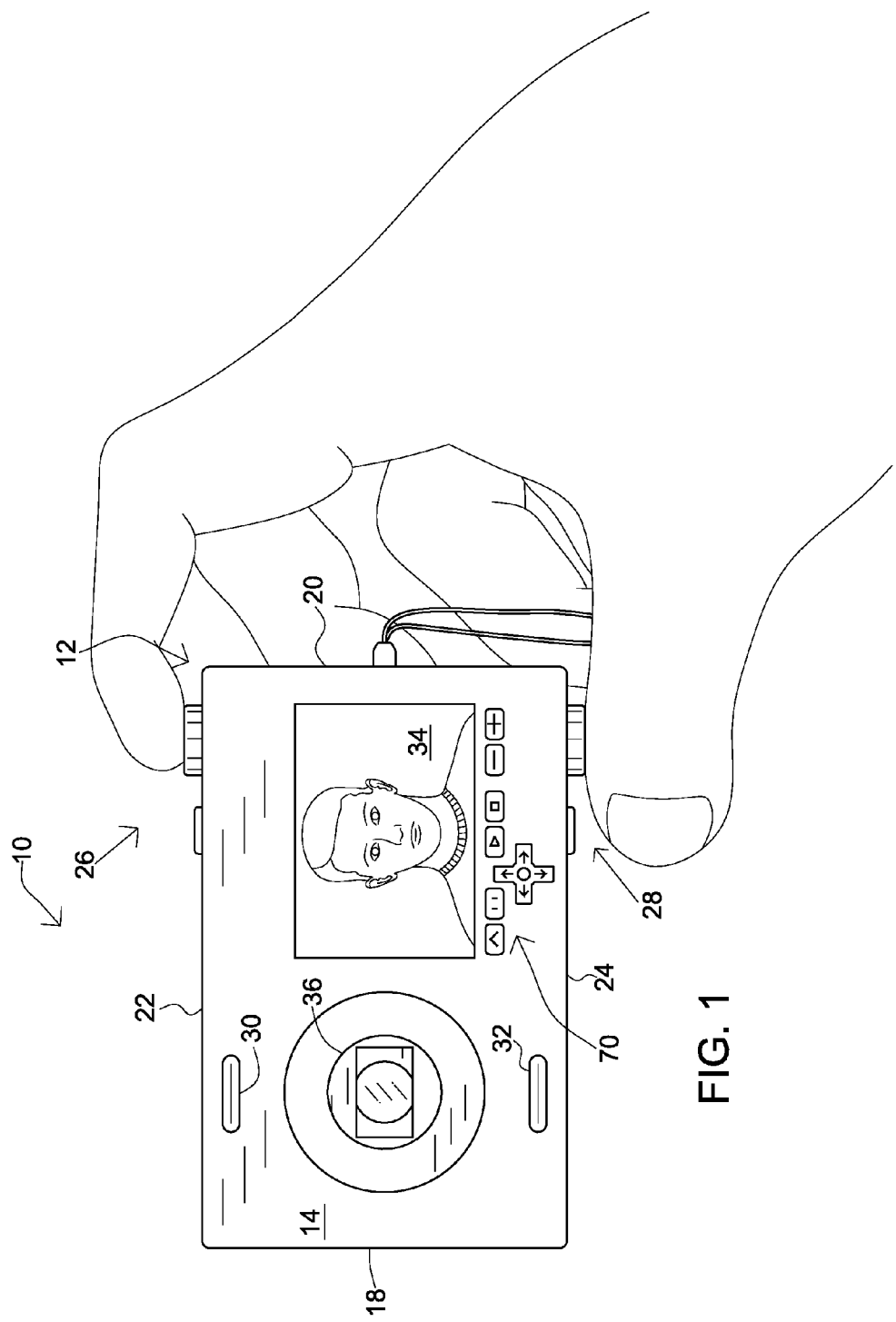
FIG. 1 is a front elevational view of a camera, according to one embodiment of the invention.

For the purposes of promoting an understanding of the principles of the invention, reference will now be made to the exemplary embodiments illustrated in the drawing(s), and specific language will be used to describe the same. It will nevertheless be understood that no limitation of the scope of the invention is thereby intended. Any alterations and further modifications of the inventive features illustrated herein, and any additional applications of the principles of the invention as illustrated herein, which would occur to one skilled in the relevant art and having possession of this disclosure, are to be considered within the scope of the invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of programmable or executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module and/or a program of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

The present invention may be described herein in terms of functional block components, screen shots, user interaction, optional selections, various processing steps, and the like. Each of such described herein may be one or more modules in exemplary embodiments of the invention. It should be appreciated that such functional blocks may be realized by any number of hardware and/or software components configured to perform the specified functions. For example, the present invention may employ various integrated circuit components, e.g., memory elements, processing elements, logic elements, look-up tables, and the like, which may carry out a variety of functions under the control of one or more microprocessors or other control devices. Similarly, the software elements of the present invention may be implemented with any programming or scripting language such as C, C++, Java, COBOL, assembler, PERL, Visual Basic, SQL Stored Procedures, AJAX, extensible markup language (XML), with the various algorithms being implemented with any combination of data structures, objects, processes, routines or other programming elements. Further, it should be noted that the present invention may employ any number of conventional techniques for data transmission, signaling, data processing, network control, and the like. Still further, the invention may detect or prevent security issues with a client-side scripting language, such as JavaScript, VBScript or the like.

Additionally, many of the functional units and/or modules herein are described as being "in communication" with other functional units and/or modules. Being "in communication" refers to any manner and/or way in which functional units and/or modules, such as, but not limited to, computers, laptop computers, PDAs, modules, and other types of hardware and/or software, may be in communication with each other. Some non-limiting examples include communicating, sending, and/or receiving data and metadata via: a network, a wireless network, software, instructions, circuitry, phone lines, internet lines, satellite signals, electric signals, electrical and magnetic fields and/or pulses, and/or so forth.

Reference throughout this specification to an "embodiment," an "example" or similar language means that a particular feature, structure, characteristic, or combinations thereof described in connection with the embodiment is included in at least one embodiment of the present invention. Thus, appearances of the phrases an "embodiment," an "example," and similar language throughout this specification may, but do not necessarily, all refer to the same embodiment, to different embodiments, or to one or more of the figures. Additionally, reference to the wording "embodiment," "example" or the like, for two or more features, elements, etc. does not mean that the features are necessarily related, dissimilar, the same, etc.

Each statement of an embodiment, or example, is to be considered independent of any other statement of an embodiment despite any use of similar or identical language characterizing each embodiment. Therefore, where one embodiment is identified as "another embodiment," the identified embodiment is independent of any other embodiments characterized by the language "another embodiment." The features, functions, and the like described herein are considered to be able to be combined in whole or in part one with another as the claims and/or art may direct, either directly or indirectly, implicitly or explicitly.

As used herein, "comprising," "including," "containing," "is," "are," "characterized by," and grammatical equivalents thereof are inclusive or open-ended terms that do not exclude additional unrecited elements or method steps. "Comprising" is to be interpreted as including the more restrictive terms "consisting of" and "consisting essentially of."

FIG. 1 illustrates an elevational view of a camera 10, according to one embodiment of the invention, wherein the camera 10 is configured to facilitate multi-positioned photography. The camera 10 includes a housing 12 having a front side 14, a left side 18, a right side 20, a top side 22, and a bottom side 24. The camera 10 also includes a pair of control interfaces 26, 28 disposed on the top side 22 and the bottom side 24 of the housing 12, flashes 30, 32, a display module 34, and a lens 36. In addition, the camera 10 includes a plurality of toggle switches 70 disposed on the front side 14 of the camera 10, wherein the plurality of toggle switches 70 is configured to provide controls for the display module 34, the lens 36, the flashes 30, 32, and to control an aspect of functionality of the camera 10. It is envisioned that the display module 34 includes a touch sensor screen; wherein the user touches the screen to toggle control interfaces.

The pair of control interfaces 26, 28 are configured to enable a left hand and a right hand user to conveniently use the camera 10, without changing the configuration of the camera 10. The control interfaces 26, 28 may include triggers, mode selectors, lens adjusters, and the like. The control interfaces 26, 28 may be mirrored in disposition, may be identical, and/or may be different such as but not limited to having overlapping functionality and/or disparate functionality.

The illustrated pair of flashes 30, 32 oppositely disposed on the front side 14 of the housing 12 such that wherein the camera is oriented upside-down the second flash is in a substantially identical position as the first relative to the lens for purposes of illuminating the subject of the photograph. The pair of flashes 30, 32 are configured to enable the user to enable a flash while taking a photo when taking a photo with either hand. Furthermore, the camera 10 includes a display module 34 disposed on the front side 14 of the housing 12.

The display module 34 is disposed on the front side 14 of the housing 12 to enable a user to view the photo image before taking a self-shot photo. The display module 34 may provide any image or information that may be displayed on the rear of a conventional digital camera, such as but not limited to stored photos, current lens views, mode status indicators, warning indicators, and the like. In addition, it is envisioned that the display module 34 includes a touch sensor screen that may be utilized to control an aspect of functionality the camera.

The front side 14 of the housing 12 also includes a lens 36 through which light may be collected and processed into an image. The lens 36 may be of any type known in the art and may be in communication with one or more of the portions described herein.

In operation of one embodiment of the invention a user turns on the camera 10 and begins to take photos like a conventional camera. The user may take photos using his/her right or left hand, without changing the configuration of the camera 10 by inverting the camera 10 and manipulating the control interfaces 26, 28 disposed about the top side 22 and the bottom side 24 of the housing 12. The right handed user may take photos of himself/herself by engaging the control interface 26 disposed about the top side 22 of the camera 10 and then views the photo image on the display module 34 disposed about the front side 14 of the camera 10. In addition, the left handed user may invert the camera 10 and also take self-shot photos by viewing the photo image on the display module 34 disposed on the front side 14 of the housing 12.

Figure 2:
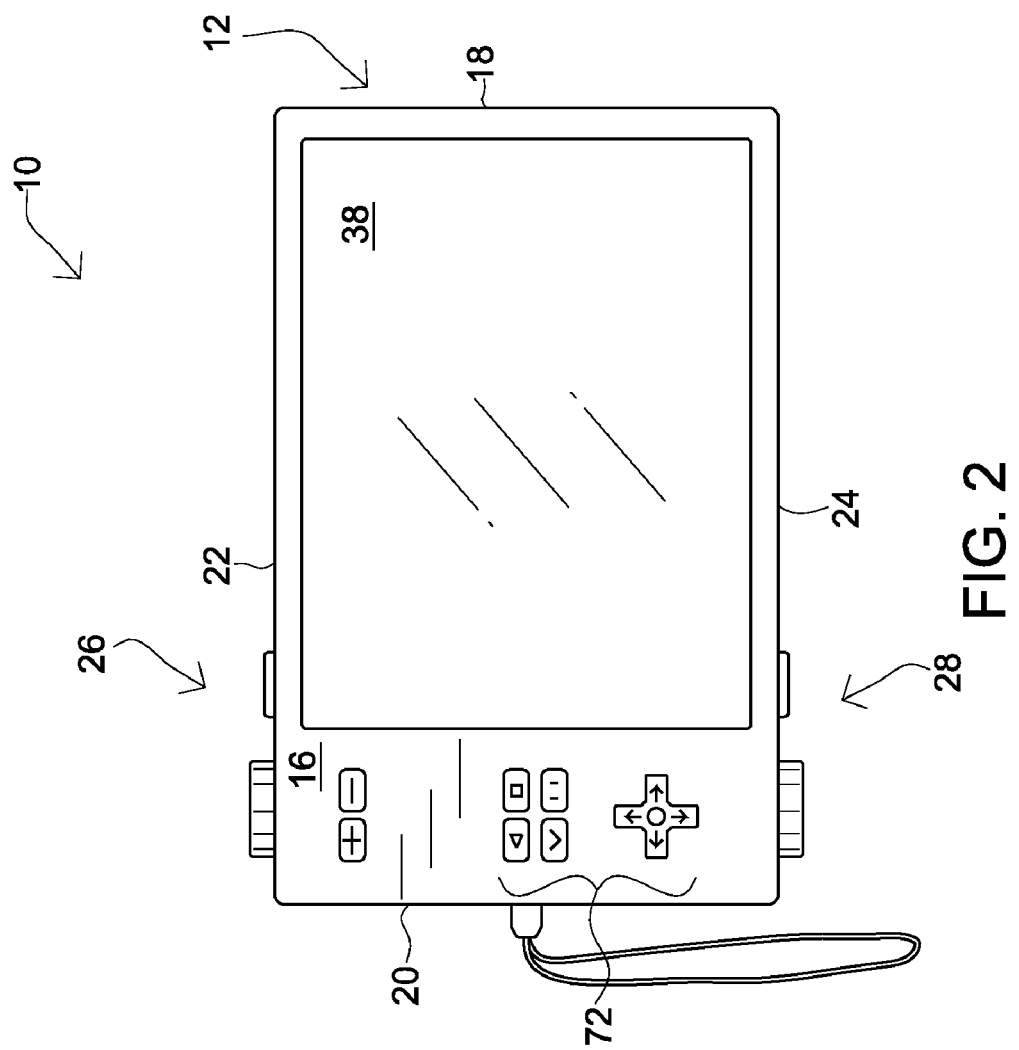
FIG. 2 is a rear elevational view of a camera, according to one embodiment of the invention.

FIG. 2 illustrates an elevational view of a camera 10, according to one embodiment of the invention, wherein the camera 10 is configured to facilitate multi-positioned photography. The camera 10 includes a housing 12 having a back side 16, a left side 18, a right side 20, a top side 22, and a bottom side 24. The camera 10 also includes a pair of control interfaces 26, 28 disposed on the top side 22 and the bottom side 24 of the housing 12. The pair of control interfaces 26, 28 are configured to enable a left hand and a right hand user to conveniently use the camera 10, without changing the configuration of the camera 10. In addition, the camera 10 includes a second display module 38 disposed on the back side 16 of the housing 12. Furthermore, the camera 10 also includes a plurality of toggle switches 72 disposed on the back side 16 of the camera 10, wherein the plurality of toggle switches 72 is configured to provide controls for the second display module 38, the lens 36, the flashes 30, 32, and to control an aspect of functionality of the camera 10. It is envisioned that the second display module 38 includes a touch sensor screen; wherein the user touches the screen to toggle control interfaces.

In operation of one embodiment of the invention, a user turns on the camera 10 and begins to take photos, wherein the camera 10 is like a conventional camera. The user may take photos using his/her right or left hand, without changing the configuration of the camera 10 by inverting the camera 10 and manipulating the control interfaces 26, 28 disposed about the top side 22 and the bottom side 24 of the housing 12. The user may view the photo image on the second display module 38 and then take the photo accordingly.

Traditionally a camera is an extension of the user. Accordingly, the user is a central component in taking the photograph. This is exemplified in the fact that in selecting a shot, a user will pivot until the desired image is in view. Advantageously, a user of the illustrated camera is no longer restricted to being behind the camera and is enabled to orient the camera in any way, because the controls, display, lights, and lens are always available for use in any orientation. Accordingly, the user may be more involved with the moment instead of being forced "out of the scene." Because of this, the uses to which a camera may be put are substantially increased. New uses and applications for cameras will develop as a result of the invention.

Figure 3:
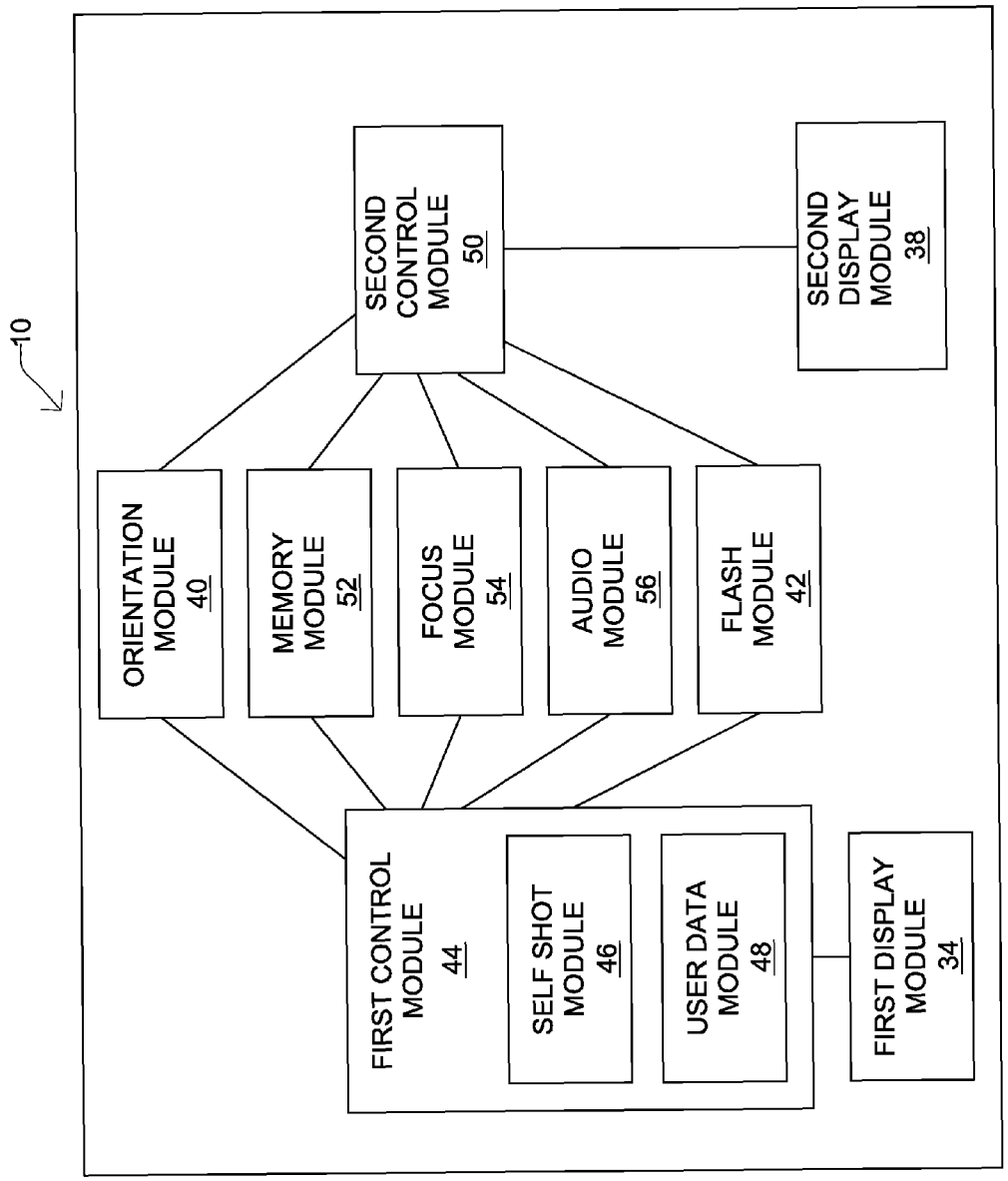
FIG. 3 is block diagram of a camera, according to one embodiment of the invention.

FIG. 3 illustrates a block diagram of a camera 10, according to one embodiment of the invention, wherein the camera 10 includes a plurality of modules as described herein. Portions of the camera as described in FIGS. 1 and 2 may be coupled to and/or in communication with one or more modules as one skilled in the art would appreciate. Further, portions of the camera and especially the control interfaces may activate, operate, and/or manipulate function of one or more of the modules described herein.

There is shown an orientation module 40 configured to detect an orientation of the housing. The orientation module 40 activates either control interfaces depending on the orientation or configuration of the camera 10. In one embodiment, an orientation module includes an accelerometer or gravimeter that may be utilized to detect orientation with respect to gravity or to detect an alteration from a predefined orientation. The accelerometer may be a three-axis accelerometer such that an exact orientation may be observed and functionality of the controls, displays, lights, lens and etc. may be altered accordingly. The following patents are incorporated by reference herein for their supporting teachings: U.S. Pat. Nos. 3,680,392; 4,414,848; and 5,487,305.

The camera 10 also includes a first control module 44 in communication with the first control interface and a second control module 50 in communication with the second control interface. The control modules 44 and 50 are also in communication with a plurality of other modules and together and/or separately may form a master control system configured to direct one or more modules described herein.

The control module(s) 44, 50 are in communication with the orientation module 40 and configured to control an aspect of functionality of the camera 10 according to the orientation information from the orientation module 40. As a non-limiting example, a change in orientation of the camera may trigger activation of a self-shot mode and/or alteration of light, lens, or control interface to facilitate use. Therefore, a user may alter functionality simply by rotating or flipping the camera. In another non-limiting example, a display orientation of an image on a display may be altered according to orientation information. Also, image orientation information used to determine a preferred orientation of an image being stored in memory may be altered according to orientation information of the camera. There is also a self-shot module 46 configured to automate a setting while taking a self photo. In one non-limiting example, a control module may include a circuit board including a processing unit and instructions for carrying out one or more of the features described herein.

The control module(s) 44, 50 also include a user data module 48 configured to store information regarding a characteristic of a user. The user data module 48 includes information related to a predetermined focal length of the camera 10 depending on the user's height and/or arm length. In a non-limiting example, a user data module 48 may include one or more banks of rewritable memory configured to store information according to a storage protocol.

The camera 10 also includes a focus module 54 in communication with the first control module 44, wherein the focus module 54 is configured to adjust the focus of the camera lens depending on the information from the user data module 48.

The illustrated first control module 44 is in communication with the first display module 34, wherein the first control module 44 is configured to control the first display module 34. Such may include activating and/or deactivating the display, and/or determining what will be displayed thereon.

The control modules 44, 50 may activate another module, such as the flash module 42, focus module 54, and display modules 34, 38 according to orientation information from the orientation module 40. The first and second control modules 44, 50 also deactivate a module, such as the flash module 42, focus module 54, and display modules 34, 38 according to orientation information from the orientation module 40.

In operation of one embodiment of the invention, a user turns on the camera 10 and begins to take photos, wherein the camera 10 is like a conventional camera. The user may take photos using his/her right or left hand, without changing the configuration of the camera 10, by inverting the camera 10; wherein the orientation module 40 is automatically configured to enable and disable control functions depending on the orientation of the camera 10. In addition, the orientation module 40 is also automatically configured to enable and disable the flash module 42 and the focus module 54 depending on the orientation of the camera 10. Furthermore, the user may include an audio attachment to a photo; wherein the user activates the audio module 56 and records an audio input along with the photo. The user may then replay the audio input when displaying the photo.

In operation of one embodiment of the invention, a display is toggled between activated/deactivated according to orientation information, such as by observation of a shaking or rotational motion of the camera.

In operation of one embodiment of the invention, a flash is toggled between an activated/deactivated status according to orientation information such as wherein a flash is positioned above the lens it may be toggled to an active status.

In operation of one embodiment of the invention, one or more modules may be toggled to an active status according to an instruction from a control interface and/or in combination with orientation data, such as but not limited to a partial depression of a trigger.

In operation of one embodiment of the invention, a user enters information relating to the user and then begins taking photos. The camera stores the information in the memory module 52. The user activates the camera into a self-shot configuration; wherein the first control module 44 is activated and the user information is in communication with the focus module 54. The user views the photo image on the first display module 34 and then takes the photo. The focus module 54 adjusts the focal length of the camera 10 depending on the user's height and/or arm length when taking a self-shot photo; thereby creating a self photo that is in focus.

It is envisioned that a user enters information relating to the user and then begins taking photos. The camera stores the information in the memory module 52. The user activates the camera into a self-shot configuration; wherein the first control module 44 is activated and the user information is in communication with the focus module 54. When in a self-shot mode, the camera may determine an initial shot characteristic based on user information stored therein. For example, such may be a standard focal length determined from height and arm length information regarding the particular user that may have been entered previously into memory and/or stored in association with a user profile. In this example, a focus module may then make corrections to the focal length of the lens based on sensory data as is understood in the art. Such corrections may be stored with the user information and utilized to enhance the consistency and/or quality of results from further use of user information. Accordingly, in a prophetic example, a tall person may take a self-shot and then hand the camera to a smaller person who may toggle activation of their user profile and take a self-shot quickly without having to wait for auto-focus. Furthermore, the individuals may take these photos with opposite handedness.

It is also envisioned that the camera includes a blackout module in communication with the control modules; wherein the blackout module is configured to disable the flash modules, the audio module, the display modules, and lights of the camera. In operation of one embodiment of the invention, a user activates the blackout module, thereby disabling the flashes, screens, and LEDs of the camera. The user takes photos without disturbing others or without being noticed.

It is understood that the above-described embodiments are only illustrative of the application of the principles of the present invention. The present invention may be embodied in other specific forms without departing from its spirit or essential characteristics. The described embodiment is to be considered in all respects only as illustrative and not restrictive. The scope of the invention is, therefore, indicated by the appended claims rather than by the foregoing description. All changes which come within the meaning and range of equivalency of the claims are to be embraced within their scope.

For example, although the figures illustrate a pair of control interfaces, a housing, a pair of flashes, a pair of display modules, a pair of control interfaces, one skilled in the art would appreciate that the components of the device may vary in size, shape, design, configuration, and still perform its intended function.

Moreover the exact positioning and orientation of portions of the camera may vary as one skilled in the art may recognize and still fall within the scope of the claims. In particular, there may be a display coupled to a top, bottom, left side, and/or right side of the housing.

Additionally, although the figures illustrate a camera, one skilled in the art would appreciate that the camera includes a video module, wherein the camera is configured to record, view, and store video images and still perform its intended function.

Thus, while the present invention has been fully described above with particularity and detail in connection with what is presently deemed to be the most practical and preferred embodiment of the invention, it will be apparent to those of ordinary skill in the art that numerous modifications, including, but not limited to, variations in size, materials, shape, form, function and manner of operation, assembly and use may be made, without departing from the principles and concepts of the invention as set forth in the claims. Further, it is contemplated that an embodiment may be limited to, consist of or to consist essentially of one or more of the features, functions, structures, methods described herein.

What is claimed is:

1. A camera for facilitating multi-positioned photography, comprising:
   a) a housing having a front side, a back side, a left side, a right side, a top side, and a bottom side;
   b) a pair of control interfaces disposed on the top side and the bottom side of the housing;
   c) a pair of flashes oppositely disposed on the front side of the housing;
   d) a pair of display modules disposed on the front side and the back side of the housing;
   e) a lens disposed on the front side of the housing; and
   f) a self-shot module including a plurality of selectable user profiles stored in a user data module, wherein a user profile includes a self-shot focal length preconfigured according to an effective arm length of an associate user, and wherein autofocus is disabled and focus is adjusted to the preconfigured focal length associated with the user profile when the self-shot module is activated and the user profile is selected.

2. The camera of claim 1, further comprising an orientation module configured to detect orientation of the camera, wherein the orientation module activates either control interface depending on the orientation or configuration of the camera, and wherein the self-shot module is toggled between active/deactive modes on the orientation module detecting shaking of the camera.

3. The camera of claim 1, further comprising an orientation module configured to detect orientation of the camera, wherein the orientation module activates a flash module depending on the orientation or configuration of the camera.

4. The camera of claim 1, further comprising an orientation module configured to detect orientation of the camera, wherein the control module activates another module according to orientation information from the orientation module.

5. The camera of claim 4, wherein the control module deactivates a module according to orientation information from the orientation module.

6. A camera for facilitating multi-positioned photography, comprising:
   a) a housing having a front side, a back side, a left side, a right side, a top side, and a bottom side;
   b) a control interface disposed on the housing;
   c) a flash disposed on the housing;
   d) a pair of display modules disposed on the front side and the back side of the housing;
   e) a lens disposed on the front side of the housing;
   f) an orientation module configured to detect an orientation of the housing;
   g) a control module in communication with the orientation module and configured to control an aspect of functionality of the camera according to the orientation information from the orientation module;
   h) a self-shot module including a plurality of selectable user profiles stored in a user data module, wherein a user profile includes a self-shot focal length preconfigured according to an effective arm length of an associate user, and wherein autofocus is disabled and focus is adjusted to the preconfigured focal length associated with the user profile when the self-shot module is activated and the user profile is selected; and
   i) a blackout module in communication with the control module and configured to selectably disable the flash, emitted sound, emitted lights, and the pair of display modules while permitting continued use of the camera thereby permitting a user to take photographs without disturbing others.

7. The camera of claim 6, wherein the orientation module triggers an alteration of function of the camera based on detection of orientation or a change in orientation, wherein orientation data from the orientation module is sampled and compared on partial depression of a trigger.

8. The camera of claim 7, wherein the control module further includes a user data module configured to store machine readable information regarding a characteristic of a user upon which the control module determines a default setting to be used when taking pictures of the associated user.

9. The camera of claim 8, wherein the orientation module activates a flash module depending on the orientation or configuration of the camera.

10. The camera of claim 9, wherein the control module activates another module according to orientation information from the orientation module.

11. The camera of claim 10, wherein the control module deactivates a module according to orientation information from the orientation module.

12. The camera of claim 11, further comprising a second control interface disposed on the camera housing opposite the first.

13. The camera of claim 12, further comprising a second flash disposed on the camera housing on the front side opposite the first flash.

14. A camera for facilitating multi-positioned photography, comprising:
   a) a housing having a front side, a back side, a left side, a right side, a top side, and a bottom side;
   b) a pair of control interfaces disposed on the top side and the bottom side of the housing;
   c) a pair of flashes oppositely disposed on the front side of the housing;
   d) a pair of display modules disposed on the front side and the back side of the housing;
   e) a lens disposed on the front side of the housing, the lens including a focus module;
   f) an orientation module configured to detect an orientation of the housing;
   wherein the orientation module activates either control interface depending on the orientation or configuration of the camera; wherein the orientation module activates a flash module depending on the orientation or configuration of the camera; and
   g) a control module in communication with the orientation module and configured to control an aspect of functionality of the camera according to the orientation information from the orientation module; wherein the control module includes a self-shot module configured to automate a setting while taking a self photo;
   wherein the control module further includes a user data module configured to store information regarding a characteristic of a user; wherein the user data module includes information related to a predetermined focal length of the camera depending on the user's height and/or arm length; wherein the control module activates another module according to orientation information from the orientation module; wherein the control module deactivates a module according to orientation information from the orientation module, wherein the focus module includes a self-shot focus mode wherein the focus module adjusts the focus of the lens according to information from the user data module.

* * * * *